US009582780B1

(12) United States Patent
Curcic et al.

(10) Patent No.: US 9,582,780 B1
(45) Date of Patent: Feb. 28, 2017

(54) CLOUD SERVICE USAGE RISK ASSESSMENT

(71) Applicant: Skyhigh Networks, Inc., Cupertino, CA (US)

(72) Inventors: Dejan Curcic, San Jose, CA (US); Rajiv Gupta, Los Altos, CA (US); Kaushik Narayan, San Jose, CA (US); Prasad Raghavendra Somasamudram, Bangalore (IN); Sekhar Sarukkai, Cupertino, CA (US)

(73) Assignee: Skyhigh Networks, Inc., Campbell, CA (US)

( * ) Notice: Subject to any disclaimer, the term of this patent is extended or adjusted under 35 U.S.C. 154(b) by 500 days.

(21) Appl. No.: 14/166,721

(22) Filed: Jan. 28, 2014

Related U.S. Application Data (60) Provisional application No. 61/758,733, filed on Jan. 30, 2013, provisional application No. 61/902,101, filed on Nov. 8, 2013.

(51) Int. Cl.
| | | |
|---|---|---|
| *G06F 12/14* | (2006.01) | |
| *G06F 12/16* | (2006.01) | |
| *G06Q 10/06* | (2012.01) | |
| *H04L 29/06* | (2006.01) | |
| *H04L 12/24* | (2006.01) | |

(52) U.S. Cl.
CPC .......... *G06Q 10/0635* (2013.01); *H04L 41/50* (2013.01); *H04L 63/1433* (2013.01)

(58) Field of Classification Search
CPC ............................. H04L 63/1433; H04L 41/50
USPC .......................................................... 726/25
See application file for complete search history.

(56) References Cited

U.S. PATENT DOCUMENTS

| | | | |
|---|---|---|---|
| 8,560,413 B1* | 10/2013 | Quarterman | ........ H04L 63/1483 705/35 |
| 9,009,837 B2* | 4/2015 | Nunez Di Croce | ................. H04L 63/1433 709/223 |
| 9,356,961 B1* | 5/2016 | Todd | ........................ H04L 63/20 |
| 2006/0122807 A1* | 6/2006 | Wittkowski | ............ G06F 17/18 702/179 |
| 2010/0125911 A1* | 5/2010 | Bhaskaran | ............. G06Q 10/10 726/23 |
| 2011/0231221 A1* | 9/2011 | Worwetz | ................ G06Q 10/06 705/7.28 |
| 2012/0265579 A1* | 10/2012 | Kaufmann | ........... G06Q 10/067 705/7.28 |

(Continued)

OTHER PUBLICATIONS

Chan et al. "Enterprise Risk Management for Cloud Computing", Jun. 2012, 32 pages, retrieved from https://web.archive.org/web/20120710195908/http://www.coso.org/documents/Cloud%020Computing%20Thought%020Paper.pdf on Jun. 10, 2016.*

*Primary Examiner* — Matthew Henning
(74) *Attorney, Agent, or Firm* — Van Pelt, Yi & James LLP (57) ABSTRACT

A method of assessing a risk level of an enterprise using cloud-based services from one or more cloud service providers includes assessing provider risk scores associated with the one or more cloud service providers; assessing cloud service usage behavior and pattern of the enterprise; and generating a risk score for the enterprise based on the provider risk scores and on the cloud service usage behavior and pattern of the enterprise. The risk score is indicative of the risk of the enterprise relating to the use of the cloud-based services from the one or more cloud service providers.

20 Claims, 6 Drawing Sheets

(56) References Cited

U.S. PATENT DOCUMENTS

| | | | | |
|---|---|---|---|---|
| 2012/0265976 A1* | 10/2012 | Spiers | ............... | H04L 63/0218 |
| | | | | 713/2 |
| 2012/0310765 A1* | 12/2012 | Masters | ............... | G06F 9/5094 |
| | | | | 705/26.3 |
| 2012/0324092 A1* | 12/2012 | Brown | ............... | G06F 9/5044 |
| | | | | 709/224 |
| 2013/0227016 A1* | 8/2013 | Risher | ............... | G06Q 10/10 |
| | | | | 709/204 |
| 2014/0053226 A1* | 2/2014 | Fadida | ............... | H04L 67/34 |
| | | | | 726/1 |
| 2014/0109206 A1* | 4/2014 | Goel | ............... | H04L 63/20 |
| | | | | 726/6 |
| 2014/0337086 A1* | 11/2014 | Asenjo | ............... | G06Q 10/0635 |
| | | | | 705/7.28 |
| 2016/0036837 A1* | 2/2016 | Jain | ............... | H04L 63/1458 |
| | | | | 726/23 |
| 2016/0044054 A1* | 2/2016 | Stiansen | ............... | H04L 63/1416 |
| | | | | 726/24 |
| 2016/0119365 A1* | 4/2016 | Barel | ............... | H04L 63/1408 |
| | | | | 726/12 |
| 2016/0127407 A1* | 5/2016 | Mankovskii | ............... | H04L 63/20 |
| | | | | 726/1 |
| 2016/0134653 A1* | 5/2016 | Vallone | ............... | H04L 41/147 |
| | | | | 726/25 |

* cited by examiner

| Risk Evaluator | | | | |
|---|---|---|---|---|
| Category: Data Risk | | | | |
| Attributes | Attribute Value | Points | Attribute Weight | Weighted Score |
| File Sharing Support | ○ Yes<br>○ No<br>○ N/A<br>○ Unknown | 80<br>10<br>30<br>70 | 18% | 14 |
| Encryption Strength | ○ 256 bit<br>○ 128 bit<br>○ 56 bit<br>○ N/A<br>○ Unknown | 20<br>35<br>65<br>50<br>60 | 23% | 15 |
| ⋮ | ⋮ | ⋮ | ⋮ | ⋮ |
| | | | Risk Category Score: | 55 |

CLOUD SERVICE USAGE RISK ASSESSMENT

CROSS REFERENCE TO OTHER APPLICATIONS

This application claims priority to U.S. Provisional Patent Application No. 61/758,733 entitled WEIGHTED, CUSTOMIZABLE, CONTEXTUAL, RISK-RATING OF CLOUD SERVICES, filed Jan. 30, 2013, and also claims priority to U.S. Provisional Patent Application No. 61/902,101 entitled CLOUD SERVICE USAGE MONITORING SYSTEM, filed Nov. 8, 2013, which applications are incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

The primary methods for cloud services risk assessment today is labor intensive based on questionnaire of compliance checklists that each cloud service provider will have to fill out. This manual assessment method has a couple of problems. First, the service provider has to cooperate which is not always possible. Second, this method needs third party validation (typically undertaken by auditors). Finally, the manual assessment method is expensive both in cost and time. There are some standards organizations such as CSA that has a service registry, but they have not identified properties associated with the cloud service via crowd-sourcing, web crawling, experience in using the cloud service, etc. and typically rely on the more traditional questionnaire approach.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a cloud service usage risk assessment system and method performs risk assessment based on an enterprise's actual use of cloud services. In some embodiments, the cloud service usage risk assessment system and method provides a risk rating for an enterprise indicative of the risk the enterprise may be exposed to by the use of certain cloud services. In some cases, based on the risk analysis, remediation or recommendations of compensating controls may be provided to the enterprise.

In some embodiments, the cloud service usage risk assessment system and method analyzes properties of a group of cloud service providers and assesses cloud service provider risk scores for the cloud service providers. A cloud service registry may be used to store information associated with the group of cloud service providers and their associated provider risk scores. Furthermore, the cloud service usage risk assessment system and method analyzes an enterprise's cloud service usage risk based on the cloud service provider risk scores and in view of the enterprise's usage behavior and pattern. The cloud service usage risk assessment system and method may provide a cloud service usage risk exposure index or an enterprise risk score based on analysis of the enterprise's cloud service usage and the provider risk scores associated with the cloud service providers being used by the enterprise.

In the present description, a "cloud-based service" or "cloud service" refers to computing resources, including hardware and software, that are delivered as a service over a data network. In most cases, the cloud service is deployed on the publicly accessible Internet. In embodiments of the present invention, the cloud-based service may also be deployed on a private data network of an enterprise, or be deployed on a third party private data network, or be deployed on a personal data network.

In the present description, a proxy server refers to a server, which can be a computer system or a software application, that acts as an intermediary for requests from clients seeking resources from other servers.

Figure 1:
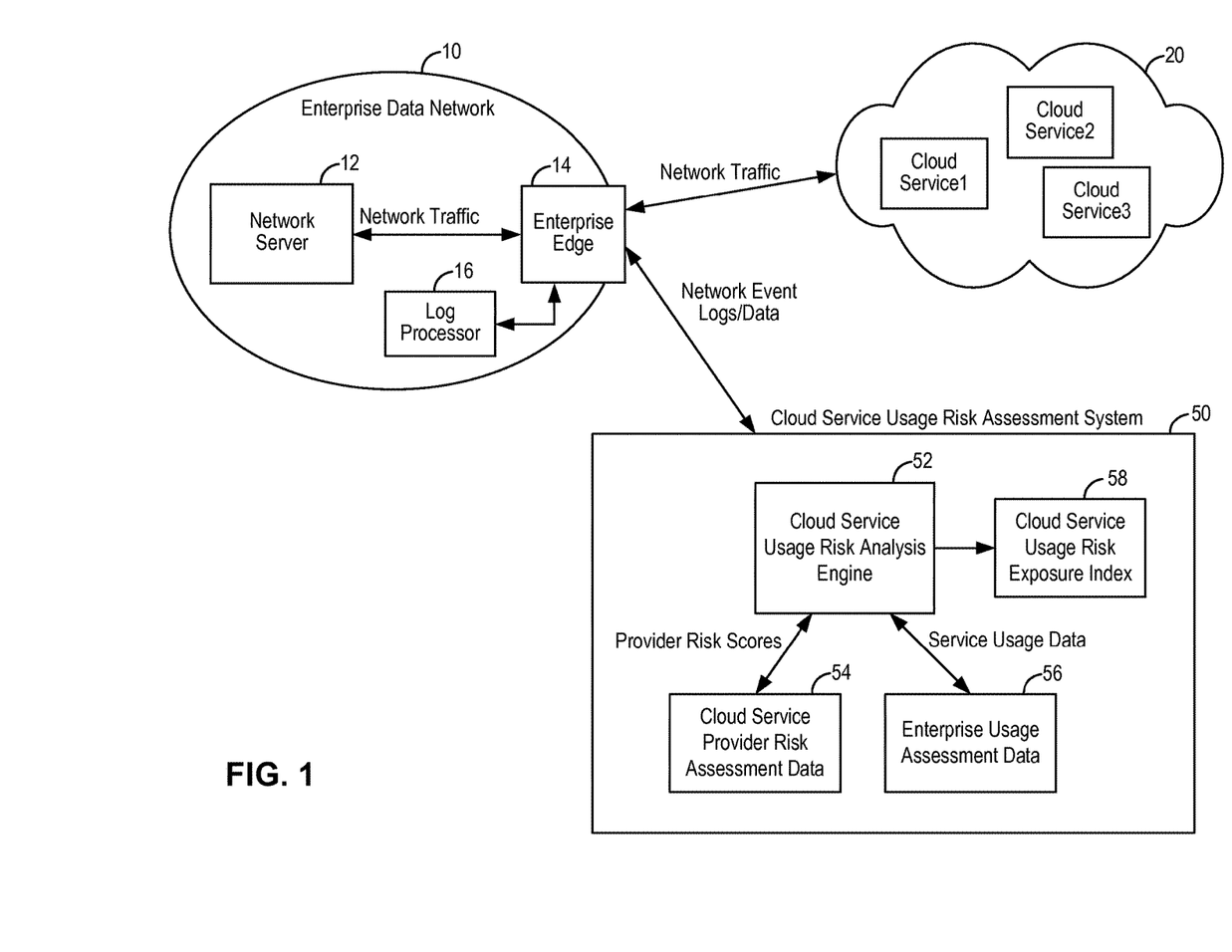
FIG. 1 is a diagram illustrating an environment in which a cloud service usage risk assessment system of the present invention can be deployed in some embodiments.

FIG. 1 is a diagram illustrating an environment in which a cloud service usage risk assessment system of the present invention can be deployed in some embodiments. Referring to FIG. 1, an enterprise may operate an enterprise data network 10 including one or more network servers 12. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as Cloud Service 1, Cloud Service 2, Cloud Service 3, that are deployed on the public data network 20. Network traffic form the network server 12 travels to the enterprise network edge 14 and then onto the cloud service providers. Network traffic from the cloud service providers are received at the enterprise network edge 14 and then transmitted onto the network server 12.

To ensure network security, the enterprise may deploy the cloud service usage risk assessment system ("the risk assessment system") of the present invention to analyze the cloud service usage and the risk associated with the cloud service usage. In embodiments of the present invention, the cloud service usage risk assessment system 50 of the present invention is configured to collect network event data and logs and analyze the network event data to determine the risk exposure for cloud services usage for that enterprise data network. In some embodiments, an on-premises log processor 16 may be deployed at the client site, that is, the enterprise data network 10, to receive and process network event logs. The log processor 16 generates processed network event data which is transmitted from the enterprise data network 10 to the off-premises cloud service usage risk assessment system 50. The use of the on-premises log processor 16 to process the network event logs is optional and may be omitted in some embodiments of the present invention. The risk assessment system 50 may receive unprocessed network event logs and data or processed network event data.

In one embodiment, the cloud service usage risk assessment system 50 is a cloud-based service and may be deployed on the publicly accessible Internet, such as public data network 20. In other embodiments, the cloud service usage risk assessment system 50 may be deployed on a private data network of an enterprise, or be deployed on a third party private data network.

In embodiments of the present invention, the cloud service usage risk assessment system 50 includes a cloud service usage risk analysis engine 52 ("risk analysis engine 52") which is configured to perform enterprise cloud service usage risk analysis based on two factors: the risk of the cloud service providers and the enterprise's cloud service usage behavior of those cloud service providers.

In particular, the risk analysis engine 52 receives cloud service provider risk assessment data 54 associated with a group of cloud service providers. The cloud service provider risk assessment data 54 describes the level of potential risk associated with using one or more cloud service providers. For example, the cloud service provider risk assessment data 54 may consider factors such as the encryption technology being used by the cloud service, the physical location of the cloud service, or the data backup methodology used by the cloud service. In some embodiments, the cloud service provider risk assessment data 54 may include provider risk scores describing the risk level associated with each cloud service provider. In some embodiments, the cloud service risk assessment data, including the provider risk scores, are stored in a database referred herein as a "cloud service registry," as will be explained in more detail below.

Furthermore, the risk analysis engine 52 receives enterprise usage assessment data 56 associated with the enterprise data network 10. The enterprise usage assessment data 56 describes the cloud service usage behavior and pattern and is derived from the network event logs and data received from the enterprise data network 10, which may be processed and filtered, or unprocessed. For example, the enterprise usage assessment data 56 may include information relating to identification of cloud service providers being used, the users using each of the identified cloud service providers, time of usage and volume of transactions, the service category of the cloud service providers, the number of users for each of the cloud services, the volume of data communicated to and from the cloud service providers, the frequency of use and also the directionality (upload or download) of the use of the cloud service providers.

In the risk assessment system 50, the risk analysis engine 52 combines the risk of the cloud service providers and the enterprise usage behavior to generate a cloud service usage risk exposure index 58 for the enterprise. In some embodiments, the cloud service usage risk exposure index 58 is a risk rating describing the level of risk the enterprise may be exposed to by the use of certain cloud services. In other embodiments, the risk analysis engine 52 may generate a set of risk exposure metrics describing the risk associated with different aspects of the enterprise's use of certain cloud services. The cloud service usage risk exposure index 58 may be generated by evaluating the set of risk exposure metrics.

In the present description, the cloud service usage risk exposure index 58 may sometimes be referred to as a "risk rating" or a "risk score." A risk score may be generated for all of the enterprise's data network traffic, or for part of the enterprise's data network traffic. The risk score generated for an enterprise will sometimes be referred to as "an enterprise risk score." In some embodiments, the risk score may be generated for the users of the enterprise's data network 10, including for individual users or for groups of users. The risk score generated for one or more users of the enterprise will sometimes be referred to as "a user risk score."

Figure 2:
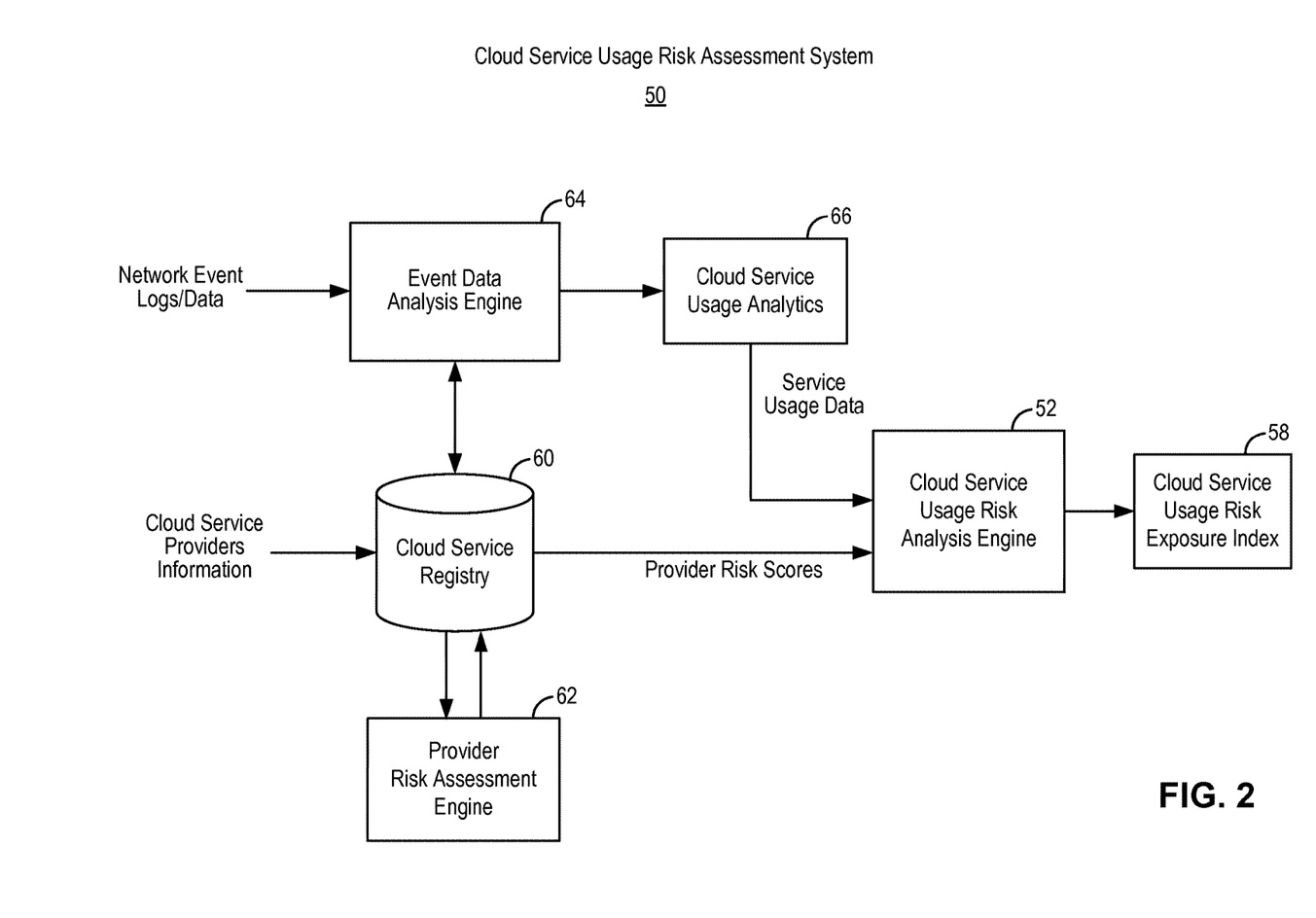
FIG. 2 is a block diagram illustrating one implementation of a cloud service usage risk assessment system according to some embodiments of the present invention.

FIG. 2 is a block diagram illustrating one implementation of a cloud service usage risk assessment system according to some embodiments of the present invention. In some embodiments, the cloud service usage risk assessment system 50 ("risk assessment system 50") is deployed on a public accessible data network, such as the Internet. Importantly, the cloud service usage risk assessment system is deployed off-premises of the enterprise's data network to alleviate the need for the enterprise to maintain hardware and systems to provide cloud usage risk analysis. The risk assessment system 50 receives two sources of data feed to perform the cloud service usage analysis.

First, the risk assessment system 50 processes information relating to cloud service providers whose services may be adopted by one or more enterprises. In particular, the risk assessment system 50 receives information pertaining to cloud service providers relating to a set of attributes. The identification of the cloud service providers and provider information, in the form of attribute values, may be stored in a database. In some embodiments, a cloud service registry 60 is used to store cloud service provider information gathered via multiple means in both human and machine readable form. For example, cloud service provider information may be obtained from multiple sources including, but not limited to, the service provider itself, the users of the cloud service, web crawling, crowd-sourced information, etc. In some embodiments, the provider information is collected on a continuous real-time basis and the provider information stored in the cloud service registry 60 is dynamically updated to ensure that the most-up-to-date information concerning the cloud service providers is gathered in the registry.

With the cloud service provider information thus obtained, the risk assessment system 50 analyzes the risk associated with using the services for each of the cloud service providers. In embodiments of the present invention, the risk assessment system 50 includes a provider risk assessment engine 62 in communication with the cloud service registry 60 to analyze the cloud service provider information stored therein to assess the risk level for each cloud service provider. In some embodiments, the provider risk assessment engine 62 generates a provider risk score for each cloud service provider based on values for the set of attributes gathered for the provider and stored in the cloud service registry 60.

In some embodiments, cloud service provider information is collected in one or more risk categories and each category includes one or more attributes. Furthermore, each attribute has one or more predetermined attributes values with each attribute value being assigned a given point value indicative of perceived risk level for that attribute value. In one embodiment, five risk categories are used, including Cloud Service risk, Data risk, User/Device risk, Business risk, and Legal risk. The use of the five risk categories and the associated attributes described herein is illustrative only. The risk assessment system 50 of the present invention can be configured to use any number of risk categories and any number of attributes within each category or other risk categories and attributes.

Figure 3:
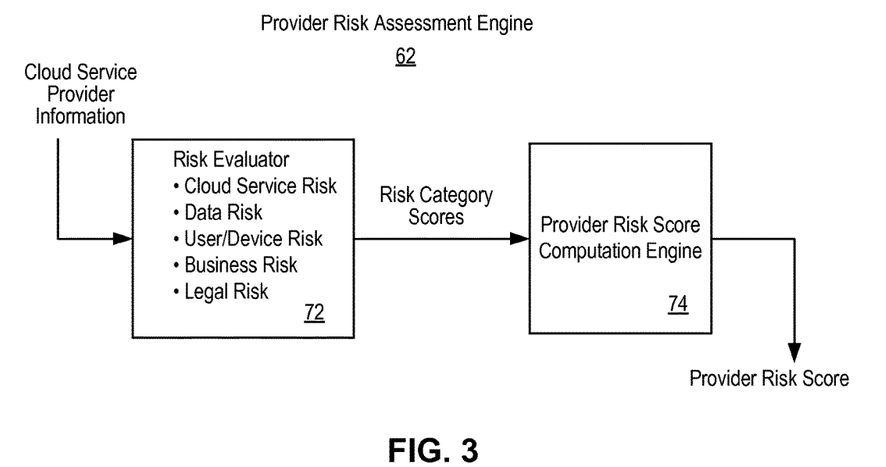
FIG. 3 is a block diagram illustrating the provider risk assessment engine in embodiments of the present invention.

FIG. 3 is a block diagram illustrating the provider risk assessment engine 62 in embodiments of the present invention. Referring to FIG. 3, the provider risk assessment engine 62 includes a risk evaluator 72 being configured to calculate risk category scores for the one or more risk categories. The provider risk assessment engine 62 further includes a provider risk score computation engine configured to analyze all of the risk category scores and to generate a provider risk score for a cloud service provider.

In the present embodiment, the provider risk assessment engine 62 uses the risk evaluator 72 to evaluate risk levels associated with the following five risk categories:

(1) Cloud Service risk—Cloud Service risk is concerned with inherent risk associated with the cloud service provider. In the present embodiment, the cloud service risk category (sometimes referred to as "service risk") includes attributes related to security practices of the cloud service provider, such as the security of the web application, the development practices, the method of authentication used, and the threat and vulnerability management practices employed. In one example, the cloud service risk category may include the following attributes with associated attribute values:

| Attribute | Attribute Values |
|---|---|
| CSRF (cross-site request forgery) prevention measures | Yes, No, Unknown |
| SQLi (SQL injection) prevention measures | Yes, No, Unknown |
| XSS (cross-site scripting) prevention measures | Yes, No, Unknown |
| Pentesting practices | Routine, Recent, Clean reputable recent, Reputable recent with issue, Unknown |
| IP filtering support | Yes, No, Unknown |
| Known malicious misuse of the site by users | No publicly known, Greater than 1 year, Less than 1 year, Less than 6 months |
| Provider known to be compromised | No publicly known, Greater than 1 year, Less than 1 year, Less than 6 months |

(2) Data risk—Data risk is concerned with how the cloud service provider handles data being stored at the provider's site. In the present embodiment, the data risk category includes attributes related to the data sharing practices, the encryption methods used, the multi-tenancy policy and practices, operation of the desktop application, data retention practices and data loss protection practices. In one example, the data risk category may include the following attributes with associated attribute values:

| Attribute | Attribute Values |
|---|---|
| File sharing support practices | Yes, No, Unknown |
| File capacity limits | 1 GB, 1-5 GB, Unlimited, Unknown |
| Data Content Type | Files, Photos, Music, Video, Source Code |
| Granular Access Control practices | Yes, No, N/A, Unknown |
| Data encryption used at rest | Yes, No, N/A, Unknown |
| Encryption Strength | 128 bit, 256 bit, 2048 bit, Unknown |
| Data Encryption used in transit | Yes, No, Unknown |
| Data Multi-tenancy | Yes, No, N/A, Unknown |
| Encryption with Tenant Managed Keys (Data Mingling practices) | Multi-tenant Data encrypted per tenant using provider's keys, Multi-tenant Data encrypted per tenant using tenant keys, Multi-tenant without encryption |
| Automatic sync of data | Yes, No, N/A, Unknown |
| Data retention on termination | Undefined, Data purged immediately, less than 15 days, 1-3 months |
| Data loss protection practices | Yes, No, Unknown |

(3) User/Device risk—User/Device risk is concerned with risk associated with users and devices accessing the provider's services. In the present embodiment, the user/device risk category includes attributes related to questionable features of the provider, user authentication practices, and security issues relating to users and devices used to access the provider's services. In one example, the user/device risk category may include the following attributes with associated attribute values:

| Attribute | Attribute Values |
| --- | --- |
| Anonymous use practices | Yes, No, Unknown |
| Multi-factor authentication | Yes, No, Unknown |
| Jail Broken Application | Yes, No, N/A, Unknown |
| Identity Federation Method | SAML & OAUTH, SAML only, OAUTH only, Unknown |
| Enterprise Identity | Yes, No, Unknown |
| Device Pinning | Yes, No, Unknown |

(4) Business risk—Business risk is concerned with the business practices of the cloud service provider. In the present embodiment, the business risk category includes attributes related to the geographic location of the provider's service hosting sites, the provider's certifications, the provider's operational practices, the provider's auditing practices, and the nature of the provider's business interest. In one example, the business risk category may include the following attributes with associated attribute values:

| Attribute | Attribute Values |
| --- | --- |
| Service hosting locations | Stored and hosted in US, Stored and hosted in privacy friendly country, Stored and hosted in a questionable country, Unknown |
| Compliance certifications | Trustee/BBB, Safe harbor/CSA Star, DCAA/SOC 2, Unknown |
| Infrastructure status reporting | Yes, No, Unknown |
| Business Headquarter | USA, Privacy Friendly Countries, Unknown |
| Admin Audit Logging | Yes, No, Unknown |
| User Activity Logging | Yes, No, Unknown |
| Data Access Logging | Yes, No, Unknown |
| Types of Business supported | Enterprise, Consumer, Both |

(5) Legal risk—Legal risk is concerned with the legal aspect of the cloud service provider. In the present embodiment, the legal risk category includes attributes related to the import/export legal practices, legal protection available by the provider, the jurisdiction of the provider, conflict resolution provisions, the contract provisions, terms of use provisions, and the intellectual property provisions. Information relating to the legal risk attributes can be collected through various means described previously, but additionally human or machine intelligence can be applied to process legal terms of use, privacy policy documents and other licensing documents which the cloud service provider often requires the end user to sign.

For example, one of the legal risk attributes may be related to the terms of use associated with the provider, such as whether there is a terms of use provided, whether there are multiple terms of use for different geography, and what the frequency of change to terms of use is. In another example, a legal risk attribute may be related to the data residency nature of the service provider, that is, the geographic location where the cloud service provider is legally signed up to store data. In another example, the legal risk attribute may be related to whether the cloud service provider is or is not in a country that is on the ITAR (International Traffic in Arms Regulations) list.

In some examples, the legal risk attribute may be related to user account termination practices, such as whether the cloud service provider has any policies around notice period for account termination, cause for termination, and resolution of data retrieval after termination. In another example, a legal risk attribute may be related to the intellectual property (IP) ownership of the data, such as whether the cloud service provider claims ownership as soon as data is uploaded to the hosting site or on termination of the user, or do the cloud service provider claims ownership of meta-data collected about the user. In another example, the legal risk attribute may be related to the privacy policy, such as whether the cloud service provider shares any user-related information (anonymized or not) to third parties.

In yet another example, the legal risk attribute may be related to whether the provider's business is impacted by compliance requirement. For example, the attribute may evaluate whether the cloud service provider has any breaches in either their downstream providers or in their own service that may result in the user or user's enterprise being covered by compliance reporting requirements. In other examples, the legal risk attribute may be related to the dispute resolution terms, such as whether the dispute resolution terms include arbitration. In other examples, the legal risk attribute may be related to the jurisdictional location of the provider's business, such as whether there are restrictions on jurisdictional locations. In other examples, the legal risk attribute may be related to the indemnity provisions of the provider's terms of use, such as whether the cloud service provider indemnifies the user or the enterprise for any breach of data. In some examples, the legal risk attribute may be related to copyright controls, such as whether the cloud service provider has copyright controls in place.

In one example, the legal risk category may include the following attributes with associated attribute values:

| Attribute | Attribute Values |
| --- | --- |
| Service Provider in ITAR List | Yes, No, Unknown |
| Indemnity provisions | Unknown, Provider indemnifies enterprise until violation of terms of use, Provider indemnifies enterprise until infringement by $3^{rd}$ party, Enterprise indemnifies Provider until violation of terms of use and/or IP infringement |
| Jurisdictional Location | US, Europe, APAC, Others |
| Dispute Resolution | Arbitration, Exclusively in Provider State/County only, Undefined |
| Account Termination policy | Sole discretion of service provider, Service provider discretion with notice period, User/Enterprise choice only |
| IP Ownership | Customer Owns, Provider Owns, Undefined |
| Statute of Limitations | 1 year, Multiple Years, Not specified |
| Privacy Policy | Collects data and does not share, Collects and shares data, Shares only on subpoena or applicable laws |
| Copyright Controls | DMCA (Digital Millennium Copyright Act) compliance, Undefined |

With the risk categories and attributes within each category thus defined, information for a set of cloud service providers is collected for the set of attributes and stored in the cloud service registry 60 (FIG. 2). The provider risk assessment engine 62 may then compute a provider risk score for each cloud service provider. First, the risk evaluator 72 computes a risk category score for each risk category. Then, the provider risk score computation engine 74 combines all of the risk category scores to generate the provider risk score associated with a cloud service provider.

A salient feature of the risk assessment system 50 is that cloud service provider information are being fed to the risk assessment system 50 continuously and in real-time so that the attribute values of the cloud service providers may be updated continuously and in real-time. Changes in characteristics of the cloud service providers are reflected back to the cloud service registry 60 and also in the computation of the provider risk scores. The provider information stored in the registry and the provider risk scores are dynamically updated. In this manner, the risk assessment system 50 provides usage risk analysis that is relevant and up-to-date.

In the present description, one example method for computing the provider risk score at the provider risk assessment engine 62 is described. It would be appreciated that other methods for computing the provider risk scores may be used and the present invention is not limited to the example described herein. In the present example, at the provider risk assessment engine 62, the risk evaluator 72 allocates category weight values to each of the risk categories. In one embodiment, the category weight values are percentage values and the risk evaluator 72 allocates the 100 percentage values to the risk categories. The allocation may be made based on the relative importance of each risk category. For example, the cloud service risk category may have a larger category weight then the user/device risk category or legal risk category. In one example, the category weights assigned to the five risk categories shown in FIG. 3 are:

Cloud Service Risk 30%
Data Risk 25%
User/Device Risk 25%
Business Risk 10%
Legal Risk 10%

Figure 4:
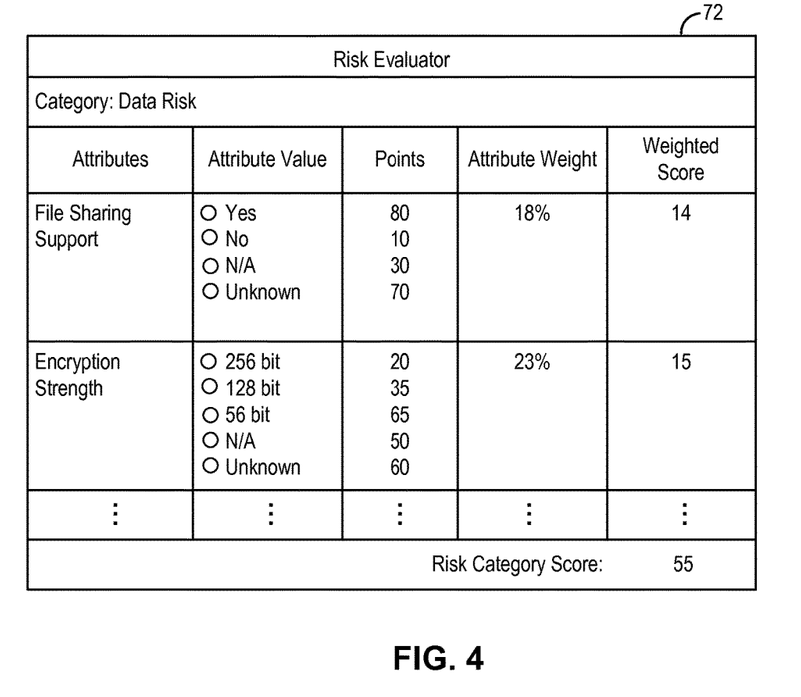
FIG. 4 illustrates the operation of the risk evaluator in computing a risk category score in embodiments of the present invention.

With the category weight values thus assigned to the risk categories, the risk evaluator 72 can then compute the risk category scores for each risk category for a cloud service provider. FIG. 4 illustrates the operation of the risk evaluator in computing a risk category score in embodiments of the present invention. In the example shown in FIG. 4, the data risk category is being evaluated. The data risk category includes one or more attributes (e.g. File Sharing Support, Encryption Strength) with each attribute having associated attribute values. For example, the attribute values for the "File Sharing Support" attribute has attribute values of "Yes, No, N/A, and Unknown"; and the attribute values for the "Encryption Strength" attribute has attribute values of "256 bit, 128 bit, 56 bit, N/A, and Unknown."

Each attribute value is assigned a point value related to the risk level of that attribute value. In the present example, the high point value indicates greater risk. For example, for the encryption strength attribute, when 256-bit encryption is used, the attribute value has a low point value (e.g. 20), whereas when 56-bit encryption is used, the attribute value has a high point value (e.g. 65). The appropriate attribute values for the service provider are selected for each attributes and the resulting point values are then assigned to the provider.

In some embodiments of the present invention, each attribute in a risk category is given equal weights and the point values for all of the attributes may be averaged and normalized to 100 to generate the risk category score. In other embodiments of the present invention, the risk evaluator 72 allocates attribute weight values to each attribute to adjust the relative contribution of an attribute to the risk category score. In one embodiment, the attribute weight is normalized to 100 and the risk evaluator 72 allocates 100-point attribute weight values to each attribute. For example, a weight of 23% is given to the encryption strength attribute and a weight of 18% is given to the file sharing support attribute so that the encryption strength attribute is given more relevancy than the file sharing support attribute. In some embodiments, the attribute weight value is adjustable and can be adjusted by the user to allow the user to modify the relative importance of the various attributes within a risk category. In this manner, the user is able to customize the risk rating calculation for the user's specific situation. In other words, the provider risk scores thus calculated for the cloud service providers are user adaptable and may be customized for each user or each enterprise.

In the present embodiment, for each cloud service provider, the risk evaluator 72 determines the attribute value for each attribute based on the cloud service provider information collected. For each selected attribute value, a point value is obtained for that attribute. Then, the risk evaluator 72 applies the attribute weight to the attribute point value to generate a weighted score for each attribute. In the example shown in FIG. 4, when the "File Sharing Support" attribute has a "Yes" attribute value, the attribute point value is 80 and with the attribute weight of 18% applied, the weighted score is 14. Similarly, when the "Encryption Strength" attribute has a "56 bit" attribute value, the attribute point value is 65 and with the attribute weight of 23% applied, the weighted score is 15. Thus, even though the "File Sharing Support" attribute has a higher point value, the weighted score for the "Encryption Strength" is higher because the attribute weight is larger.

The risk evaluator 72 then combines the weighted scores for all the attributes in a risk category to generate a risk category score. In one embodiment, the weighted scores are added to generate the risk category score. In the present example, the attribute weights are normalized to 100 by the operation of the attribute weight having 100 points total for all attributes. In other embodiments, the weighted scores may be added and then normalized. In the example shown in FIG. 4, a risk category score of 55/100 is generated for the Data Risk category.

With the risk category scores for all categories thus computed, the provider risk score computation engine 74 aggregates all of the risk category scores and generate a provider risk score for each service provider. In one embodiment, each risk category score is multiplied by the respective category weight. The weighted risk category scores are summed to generate the provider risk score. The provider risk scores thus computed can be stored in the cloud service registry 60 (FIG. 2). In the example shown in FIG. 4, the provider risk score is normalized to 100 by the operation of the category weight having 100 points total for all risk categories.

| Cloud Service Risk | 68 | 30% | 20 |
|---|---|---|---|
| Data Risk | 55 | 25% | 14 |
| User/Device Risk | 42 | 25% | 11 |
| Business Risk | 62 | 10% | 6 |
| Legal Risk | 71 | 10% | 7 |
| Provider Risk Score: 59/100 | | | |

In the above described embodiments, the provider risk score is computed by first computing risk category scores and then aggregating the risk category scores to generate the provider risk score. In other embodiments, the use of risk categories may be omitted and all attributes may be treated as being grouped into a single category. The weighted scores of all the attributes are then combined accordingly to generate the provider risk score directly. The provider risk score may be normalized as needed.

In embodiments of the present invention, the provider risk score may be updated periodically, such as daily, to reflect changes in the characteristics and operation of the cloud service providers. The cloud service provider information may be provided to the provider risk assessment engine 62 so that the provider risk scores can be updated dynamically.

Returning to FIG. 2, with the provider risk score thus computed and stored, the cloud service risk usage risk assessment system 50 applies the provider risk assessment to the enterprise's actual use of the cloud services to assess the usage risk exposed to the enterprise by the enterprise's usage behavior and pattern. In risk assessment system 50, network event logs and data from the enterprise data network are received by an event data analysis engine 64. The network event logs and data may be processed and filtered, such as by an on-premises log processor before the network data is transmitted to the risk assessment system 50. As described above, the event logs and data contains information relating to the data traffic going through the enterprise data network. The event logs and data may be processed and filtered to select only web traffic flows between users of the enterprise data network and cloud service providers.

The event data analysis engine 64 is in communication with the cloud service registry 60 to obtain information related to cloud service providers that are used by the enterprise's users, as evidenced in the network event logs and data. The event data analysis engine 64 receives the event logs and data for the enterprise data network and operates to correlate the network event data to cloud service providers, using the information stored in the cloud service registry 60. The event data analysis engine 64 may also perform analysis to detect anomaly in the network event data. For example, the event data analysis engine 64 may detect for unusual activities of a user, or a certain usage pattern, or a large amount of data download by a user. The event data analysis engine 64 analyzes the network event data to generate one or more cloud service usage analytics 66. The cloud service usage analytics 66 can include, but not limited to, information relating to identification of cloud service providers being used, the users using each of the identified cloud service providers, time of usage and volume of transactions, and the service category of the cloud service providers. The service categories of the cloud service provides relate to the types of services provided by the providers, including social media, cloud storage, content sharing, web application API, collaboration, marking and others.

Figure 5:
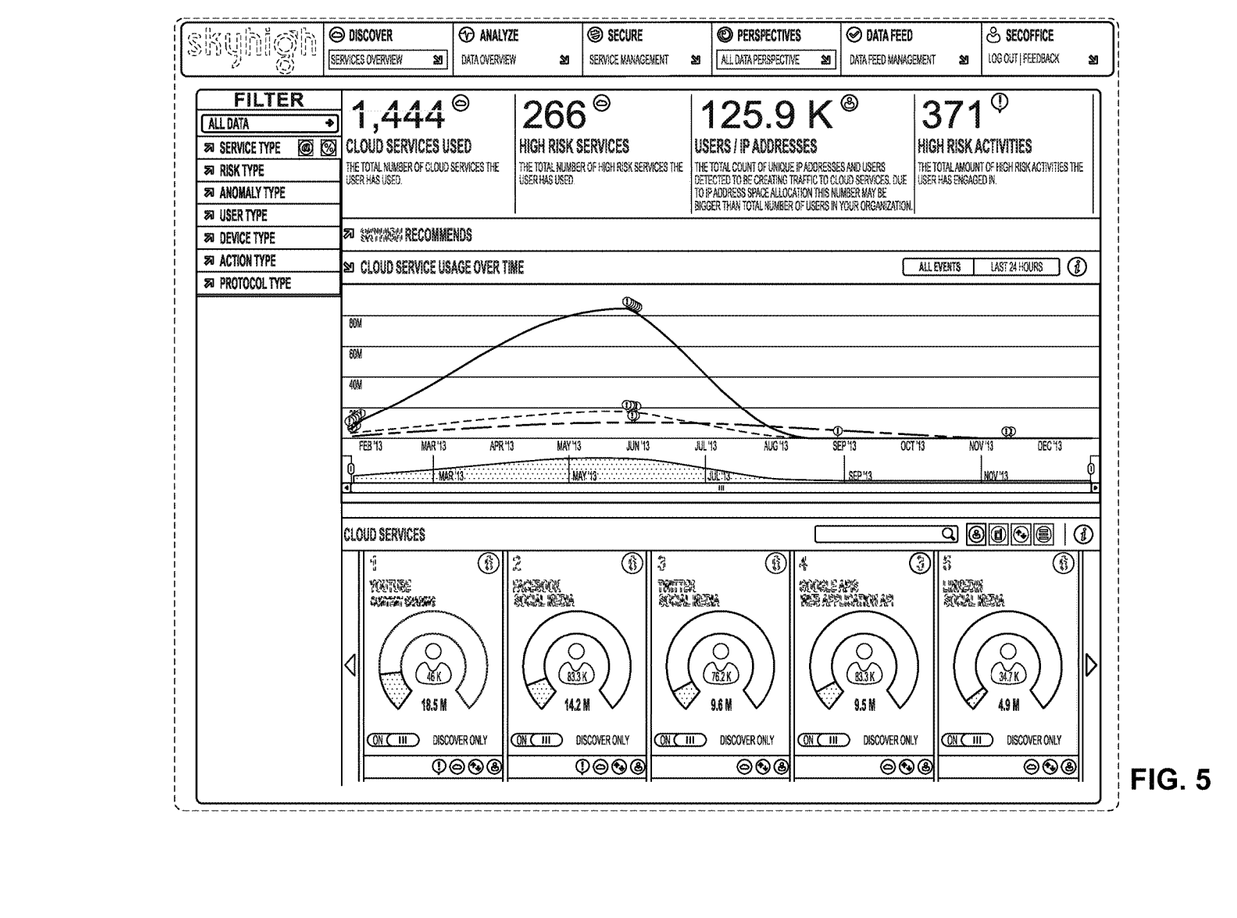
FIG. 5 is an example user interface which may be used to display the usage analytics to a user of the enterprise.

For example, in some embodiments, the usage analytics 66 may provide information relating to the detected number of cloud service providers being used, the detected number of high risk service providers being used, the detected number of users or unique IP addresses using each cloud service, and the detected volume of high risk activities that users of the enterprise may be engaged in. As further examples, the usage analytics 66 may include the cloud service usage (in terms of date volume) over time, and the ranking of cloud service providers based on cloud service usage volume. FIG. 5 is an example user interface which may be used to display the usage analytics 66 to a user of the enterprise.

The risk assessment system 50 includes a cloud service usage risk analysis engine 52 which correlates the cloud service usage data from the usage analytics 66 and the provider risk scores stored in registry 60 and generates a cloud service usage risk exposure index 58 for the enterprise. In some embodiments, the risk analysis engine 52 may generate a set of risk exposure metrics associated with the enterprise's use of certain cloud services. The cloud service usage risk exposure index 58 may be generated by evaluating the set of risk exposure metrics. For example, the risk analysis engine 52 may evaluate risk exposure metrics associated with the types of cloud services the enterprise is using, such as whether the cloud service providers are high risk providers or low risk providers or the types of services (e.g. social media or storage). The risk analysis engine 52 may further evaluate risk exposure metrics associated with the volume of data being communicated to and from the cloud service providers, such as whether the volume is normal or larger than normal. The risk analysis engine 52 may further evaluate risk exposure metrics associated with the directionality of the data, such as the volume of data being uploaded versus downloaded. The risk analysis engine 52 may further evaluate risk exposure metrics associated with the status of the cloud service, such as whether the enterprise block or allow the cloud service provider.

The risk exposure metrics are combined with the provider risk score to generate a risk score for the enterprise's usage of that particular cloud service provider. For example, the exposure metrics may be used to generate a usage risk score weight value for each cloud service provider being used. The provider risk score is multiplied by the risk score weight value for that cloud service provider to generate a usage risk score for that provider. The usage risk scores for all the cloud service providers the enterprise is using are combined to generate a risk score for the enterprise. For example, the enterprise risk score may be generated by summing and normalizing all the usage risk scores of all the cloud service providers the enterprise is using.

In some embodiments, an enterprise risk score is generated to indicate the risk level of the enterprise's network activities with respect to the use of certain cloud-based services. In other examples, a user risk score is generated to indicate the risk level of one or more users' network activities with respect to the use of certain cloud-based services.

In one embodiment, the cloud service usage risk analysis engine 52 evaluates the enterprise risk score and/or the user risk score on a periodic basis, such as every minute or every 15 minutes. At a given time interval, the cloud service usage risk analysis engine 52 evaluates the enterprise's cloud service usage data for that time interval and combines the cloud usage analytics generated for that time interval with the provider risk scores to generate the enterprise risk score for that time interval. User risk scores may also be generated for the same time interval based on the network activities of the one or more users. In some examples, at each time interval, a running average of the enterprise risk score and the user risk scores are generated.

As thus configured, the cloud service usage risk assessment system, including the off-premises cloud service usage risk analysis system, is applied to analyze the network traffic for an enterprise and to provide the enterprise insight into the risk exposure of using certain cloud services. Importantly, as the risk assessment system receives network data and the provider information in real-time, the usage risk for the enterprise can also be updated in real-time so that the risk index reflects historical and current activities.

In some examples, the cloud service usage risk analysis engine 52 uses meta-data about the enterprise (such as location of business, business vertical, size, etc.) to highlight risk areas that may be related to compliance issues, such as HIPPA related risk for a hospital), related to legal risk, such as granting of intellectual property to cloud service when using that service, and related to security risk, such as unencrypted storage of sensitive data.

Figure 6:
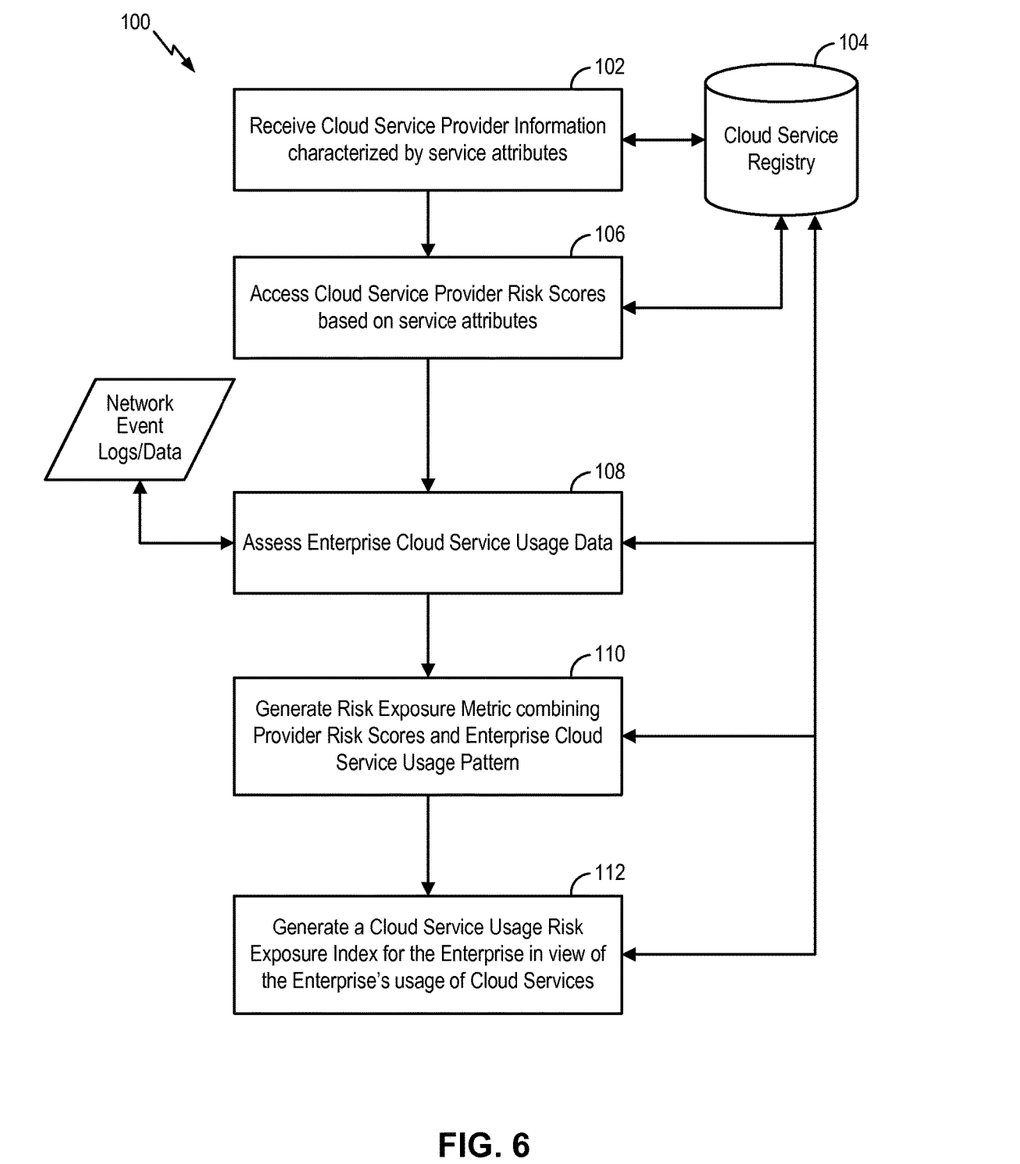
FIG. 6 is a flowchart illustrating a cloud service usage risk assessment method in embodiments of the present invention.

FIG. 6 is a flowchart illustrating a cloud service usage risk assessment method in embodiments of the present invention. Referring to FIG. 6, the cloud service usages risk assessment method 100 ("method 100") starts by receiving cloud service providers information characterized by service attributes (102). The cloud service provider information may be stored in a database, such as a cloud service registry 104. The method 100 accesses cloud service provider risk scores for the cloud service providers based on the service attributes for each provider (106). The provider risk scores may be computed by accessing the cloud service provider information stored in the registry 104. In some embodiments, the provider risk scores are computed by assigning point values to the attribute values and aggregating all the point values for all attributes. In some embodiments, an attribute weight factor can be applied to the point values to adjust the relative contribution of the attributes to the final provider risk score. The provider risk scores thus generated may be stored in the cloud service registry 104.

The method 100 then assess the enterprise's cloud service usage data based on network event logs and data received from the enterprise data network (108). In some embodiments, the network event logs and data may be processed and filtered. The method 100 correlates the network event data with the cloud service provider information, such as the information stored in the registry 104, to obtain information relating to the enterprise's cloud service usage pattern and behavior. The method 100 generates a set of risk exposure metrics associated with the enterprise's use of certain cloud services (110). That is, the risk exposure metrics are generated based on the enterprise's cloud service usage pattern and behavior. In some examples, the risk exposure metrics relate to the types of cloud services being used (social media or storage), the volume of data being communicated to and from the cloud service providers, the directionality of the data (upload or download), and the status of the cloud service (block or allowed).

Then method 100 generates a cloud service usage risk exposure index for the enterprise based on the enterprise's usage of cloud services (112). In some embodiments, the risk exposure index is generated by evaluating the set of risk exposure metrics and applying the provider risk scores for the cloud service providers being used. Furthermore, in some embodiments, an enterprise risk score is generated to indicate the risk level of the enterprise's network activities with respect to the use of certain cloud-based services. In other examples, a user risk score is generated to indicate the risk level of one or more users' network activities with respect to the use of certain cloud-based services.

Figure 7:
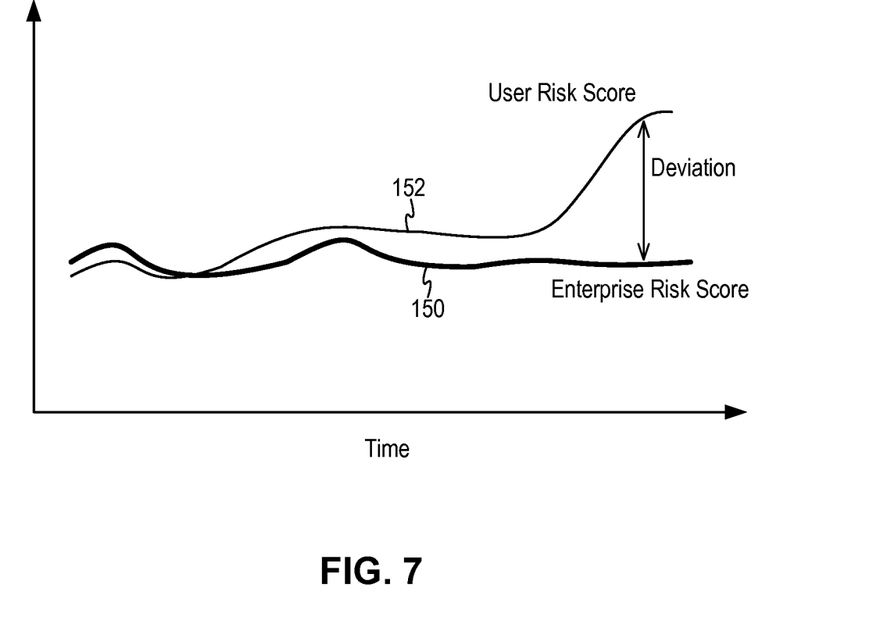
FIG. 7 is a time-series plot illustrating an enterprise risk score in comparison with a user risk score in an example of the present invention.

In embodiments of the present invention, with the enterprise risk score and/or the user risk score thus generated, the cloud service usage risk assessment system is configured to provide additional risk exposure analysis, such as trench analysis or time-series analysis. In one embodiment, the risk assessment system performs trench analysis or time-series analysis of the enterprise risk score in comparison with the user risk score. In particular, the enterprise risk score and the user risk score of one or more users are compared or tracked over time to detect for factors that may indicate security concerns for the enterprise. FIG. 7 is a time-series plot illustrating an enterprise risk score in comparison with a user risk score in an example of the present invention. The enterprise risk score (curve 150) refers to the risk exposure index generated for the cloud service usage activities of an enterprise which can be part of or all of the enterprise's cloud service activities. The user risk score (curve 152) refers to the risk exposure index generated for the cloud service usage activities of one or more user of the enterprise. For example, the user risk score can be generated for individual users of the enterprise or for groups of users of the enterprise.

The risk assessment system evaluates the cloud service usage risk for the enterprise by analyzing three facades of the enterprise risk score and the user risk score using time-series analysis. First, the risk assessment system evaluates a running average of the enterprise risk score to detect for changes in the risk level for the enterprise. For example, the running average can be an N-day running average. The enterprise risk score at a current time interval can be monitored to detect an upward trench indicating increasing levels of risk. The average enterprise risk score of a current time period (e.g. a week) can also be compared with the average enterprise risk score of a previous time period to detect for any upward trench that may indicate increasing levels of risk. In one example, the risk assessment system detects when the enterprise risk score at the current time interval has increased more than a given limit of the running average of the enterprise risk score and issue an alert to the enterprise. For example, the limit can be two or three standard deviation (or sigma) from the running average of the enterprise risk score.

Second, the risk assessment system evaluates a running N-day average user risk score to detect for sudden changes in the user's cloud service activities. A user risk score for the current time interval is compared against the running N-day average of the same user risk score. A sudden change, such as a large increase, in the user risk score in the current time interval as compared to the average risk score of the same user can be indication of risky activities. In one example, the risk assessment system detects when the user risk score at the current time interval has increased more than a given limit of the running N-day average of the same user risk score and issue an alert to the enterprise. For example, the limit can be two or three standard deviation (or sigma) from the running average of the enterprise risk score.

Third, the risk assessment system evaluates the user risk score to detect for large deviation from the average enterprise risk score. When a user risk score deviates from the enterprise risk score by a large amount, the deviation can be indication that one or more users of the enterprise are engaging in risky cloud service activities. Referring to FIG. 7, the user risk score can be tracked along with the average enterprise risk score. When the user risk score deviates from the enterprise risk score by a large amount, such as when the deviation is greater than 5 standard deviation (or 5 sigma), an alert may be issued to the enterprise. In some examples, the enterprise may compare the user risk scores for all of its users or a group of users to the enterprise risk score to identify users who are engaging in high risk activities.

In some embodiments of the present invention, the risk assessment system generates suggestions for remediation to the enterprise based on the enterprise risk score analysis. The risk assessment system generates suggestions to the enterprise to enable the enterprise to improve the enterprise's risk exposure index or to lower the risk.

In one example, the risk assessment system uses the analysis of the user risk score in comparison to the enterprise risk score to identify one or more users at the enterprise engaging in risky could service activities. The risk assessment system may suggest to the enterprise means to restrict high risk activities by the users. In one embodiment, the risk assessment system may generate network control commands the enterprise can use to block undesired cloud service providers.

In another example, the risk assessment system may determine certain cloud service providers used by the enterprise have high risk rating and suggest to the enterprise other cloud service providers that have lower risk exposure.

In another example, the risk assessment system may enable the enterprise to monitor the cloud service activities of one or more of its users or employees to detect for usage pattern in compliance or in violation of company policies.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of assessing a risk level of an enterprise using cloud-based services from one or more cloud service providers, the method comprising:
   receiving, at a hardware processor, cloud service provider information characterized by a plurality of attributes, each attribute being associated with a plurality of attribute values, each attribute value being associated with a point value;
   for each cloud service provider, assessing, at the processor, the attribute point value for each attribute based on the cloud service provider information;
   aggregating, at the processor, the attribute point values for all of the plurality of attributes associated with each cloud service provider;
   generating, at the processor, a provider risk score for each cloud service provider based on the aggregated attribute point values associated with the cloud service provider;
   receiving, at the processor, network event data from a data network associated with the enterprise, the network event data relating to network data traffic between the data network and the one or more cloud service providers;
   correlating, at the processor, the network event data to the one or more cloud service providers;
   generating, at the processor, one or more cloud service usage analytics based on the network event data and the cloud service provider information associated with the cloud service providers correlated to the network event data;
   generating, using the processor, a risk score for the enterprise based on the provider risk scores for the cloud service providers correlated to the network event data and based on the cloud service usage analytics indicative of the cloud service usage behavior and pattern of the enterprise, the risk score being indicative of the risk of the enterprise relating to the use of the cloud-based services from the one or more cloud service providers; and
   generating, at the processor, an output comprising a remediation means based on the risk score generated for the enterprise.

2. The method of claim 1, further comprising:
   assigning attribute weight values to each of the plurality of attributes, the attribute weight values being applied to adjust the relative contribution of an attribute to the provider risk score; and
   for each cloud service provider, assessing the attribute point value for each attribute based on the cloud service provider information, the attribute point value being adjusted by the respective attribute weight value.

3. The method of claim 1, wherein receiving cloud service provider information characterized by a plurality of attributes comprises:
   receiving cloud service provider information characterized by the plurality of attributes, the plurality of attributes belonging to one or more risk categories, the risk categories including one or more of a cloud service risk, a data risk, a user/device risk, and a business risk, the cloud service risk being related to the inherent risk of the cloud service provider, the data risk being related to handling of data at the cloud service provider, the user/device risk being related to users and devices accessing the cloud-based service of the cloud service providers, and the business risk being related to business practices of the cloud service providers.

4. The method of claim 1, wherein receiving cloud service provider information characterized by a plurality of attributes comprises:
   receiving cloud service provider information characterized by the plurality of attributes, the plurality of attributes belonging to a legal risk category relating to the legal aspect of the cloud service providers.

5. The method of claim 1, wherein generating one or more cloud service usage analytics based on the network event data and the cloud service provider information comprises:
   generating service usage analytics relating to one or more of identification of cloud service providers being used, users of the enterprise using each of the identified cloud service providers, time of usage, volume of usage, directionality of the data, and the service category of the cloud service providers.

6. The method of claim 1, wherein generating a risk score for the enterprise comprises:
   generating an enterprise risk score associated with a part of or all of the cloud service usage behavior and pattern belonging to the enterprise; and
   generating a user risk score associated with the cloud service usage behavior and pattern belonging to one or more users of the enterprise.

7. The method of claim 6, further comprising:
   generating an N-day average enterprise risk score using the enterprise risk score;
   comparing the enterprise risk score at a given time interval to the N-day average enterprise risk score;
   detecting the enterprise risk score at a given time interval exceeding the N-day average enterprise risk score by a predetermined limit value; and
   generating an alert for the enterprise in response to the detecting.

8. The method of claim 6, further comprising:
   generating an N-day average user risk score using the user risk score;
   comparing the user risk score at a given time interval to the N-day average user risk score;
   detecting the user risk score at a given time interval exceeding the N-day average user risk score by a predetermined limit value; and
   generating an alert for the enterprise in response to the detecting.

9. The method of claim 6, further comprising:
   generating an N-day average enterprise risk score using the enterprise risk score;
   comparing the user risk score at a given time interval to the N-day average enterprise risk score;

detecting the user risk score at a given time interval exceeding the N-day average enterprise risk score by a predetermined limit value; and generating an alert for the enterprise in response to the detecting.

10. The method of claim 1, further comprising:

determining factors of the risk score of the enterprise relating to a high risk level; and generating recommendation for the enterprise to improve the risk score.

11. The method of claim 10, wherein generating recommendation for the enterprise to improve on the risk score comprises:

generating recommendation to the enterprise to block or restrict access to one or more cloud service providers identified as being high risk.

12. The method of claim 10, wherein generating recommendation for the enterprise to improve on the risk score comprises:

generating recommendation to the enterprise to use alternate cloud service providers.

13. A system for assessing a risk level of an enterprise using cloud-based services from one or more cloud service providers, the system comprising:

a hardware processor configured to:

receive cloud service provider information characterized by a plurality of attributes, each attribute being associated with a plurality of attribute values, each attribute value being associated with a point value;

for each cloud service provider, assess the attribute point value for each attribute based on the cloud service provider information;

aggregate the attribute point values for all of the plurality of attributes associated with a cloud service provider;

generate a provider risk score for each cloud service provider based on the aggregated attribute point values associated with the cloud service provider;

receive network event data from a data network associated with the enterprise, the network event data relating to network data traffic between the data network and the one or more cloud service providers;

correlate the network event data to the one or more cloud service providers;

generate one or more cloud service usage analytics based on the network event data and the cloud service provider information associated with the cloud service providers correlated to the network event data;

generate a risk score for the enterprise based on the provider risk scores for the cloud service providers correlated to the network event data and based on the cloud service usage analytics indicative of the cloud service usage behavior and pattern of the enterprise, the risk score being indicative of the risk of the enterprise relating to the use of the cloud-based services from the one or more cloud service providers; and generate an output comprising a remediation means based on the risk score generated for the enterprise; and a memory coupled to the processor and configured to provide the processor with instructions.

14. The system of claim 13, wherein the processor is further configured to:

determine factors in the risk score of the enterprise relating to a high risk level; and generate recommendation for the enterprise to improve the risk score.

15. The system of claim 13, wherein the processor is further configured to:

generate service usage analytics relating to one or more of identification of cloud service providers being used, users of the enterprise using each of the identified cloud service providers, time of usage, volume of usage, directionality of the data, and the service category of the cloud service providers.

16. The system of claim 13, wherein the processor is further configured to:

generate an enterprise risk score associated with a part of or all of the cloud service usage behavior and pattern belonging to the enterprise; and generate a user risk score associated with the cloud service usage behavior and pattern belonging to one or more users of the enterprise.

17. The system of claim 16, wherein the processor is further configured to:

generate an N-day average enterprise risk score using the enterprise risk score;

compare the enterprise risk score at a given time interval to the N-day average enterprise risk score;

detect the enterprise risk score at a given time interval exceeding the N-day average enterprise risk score by a predetermined limit value; and generate an alert for the enterprise in response to the detecting.

18. A tangible and non-transitory computer readable storage medium comprising a computer program product for assessing a risk level of an enterprise using cloud-based services from one or more cloud service providers, the computer program product comprising computer instructions for:

receiving, at a processor, cloud service provider information characterized by a plurality of attributes, each attribute being associated with a plurality of attribute values, each attribute value being associated with a point value;

for each cloud service provider, assessing, at the processor, the attribute point value for each attribute based on the cloud service provider information;

aggregating, at the processor, the attribute point values for all of the plurality of attributes associated with each cloud service provider;

generating, at the processor, a provider risk score for each cloud service provider based on the aggregated attribute point values associated with the cloud service provider;

receiving, at the processor, network event data from a data network associated with the enterprise, the network event data relating to network data traffic between the data network and the one or more cloud service providers;

correlating, at the processor, the network event data to the one or more cloud service providers;

generating, at the processor, one or more cloud service usage analytics based on the network event data and the cloud service provider information associated with the cloud service providers correlated to the network event data;

generating, using the processor, a risk score for the enterprise based on the provider risk scores for the cloud service providers correlated to the network event data and based on the cloud service usage analytics indicative of the cloud service usage behavior and pattern of the enterprise, the risk score being indicative of the risk of the enterprise relating to the use of the cloud-based services from the one or more cloud service providers; and generating, at the processing, an output comprising a remediation means based on the risk score generated for the enterprise.

19. The tangible and non-transitory computer readable storage medium recited in claim 18, further comprising computer instructions for:

generating service usage analytics relating to one or more of identification of cloud service providers being used, users of the enterprise using each of the identified cloud service providers, time of usage, volume of usage, directionality of the data, and the service category of the cloud service providers.

20. The tangible and non-transitory computer readable storage medium recited in claim 18, further comprising computer instructions for:

generating an enterprise risk score associated with a part of or all of the cloud service usage behavior and pattern belonging to the enterprise; and generating a user risk score associated with the cloud service usage behavior and pattern belonging to one or more users of the enterprise.

* * * * *